(12) United States Patent
Kuhlmann et al.

(10) Patent No.: US 11,704,476 B2
(45) Date of Patent: Jul. 18, 2023

(54) TEXT LINE NORMALIZATION SYSTEMS AND METHODS

(71) Applicant: Leverton Holding LLC, Solon, OH (US)

(72) Inventors: Florian Kuhlmann, Berlin (DE); Michael Kieweg, Berlin (DE); Saurabh Shekhar Verma, Berlin (DE)

(73) Assignee: LEVERTON HOLDING LLC, Solon, OH (US)

( * ) Notice: Subject to any disclaimer, the term of this patent is extended or adjusted under 35 U.S.C. 154(b) by 0 days.

(21) Appl. No.: 17/372,655

(22) Filed: Jul. 12, 2021

(65) Prior Publication Data

US 2021/0334573 A1 Oct. 28, 2021

Related U.S. Application Data

(63) Continuation of application No. 16/513,094, filed on Jul. 16, 2019, now Pat. No. 11,062,164.

(60) Provisional application No. 62/700,427, filed on Jul. 19, 2018.

(51) Int. Cl.
| | |
|---|---|
| *G06F 40/109* | (2020.01) |
| *G06V 30/148* | (2022.01) |
| *G06V 10/82* | (2022.01) |
| *G06V 10/24* | (2022.01) |
| *G06V 10/50* | (2022.01) |

(52) U.S. Cl.
CPC .......... *G06F 40/109* (2020.01); *G06V 10/242* (2022.01); *G06V 10/243* (2022.01); *G06V 10/507* (2022.01); *G06V 10/82* (2022.01); *G06V 30/158* (2022.01)

(58) Field of Classification Search
CPC ...... G06K 9/348; G06K 9/68; G06K 9/00442; G06K 9/42; G06K 9/4647; G06K 9/3275; G06K 9/3208; G06F 40/205; G06F 40/109; G06N 20/00; G06N 3/0445; G06N 3/0454; G06N 7/005
USPC ......................................................... 382/177
See application file for complete search history.

(56) References Cited

U.S. PATENT DOCUMENTS 10,073,859 B2 * 9/2018 Hull ..................... G06V 30/268

OTHER PUBLICATIONS

International Search Report and Written Opinion dated Sep. 19, 2019 issued for International PCT Application No. PCT/EP2019/069450 filed Jul. 18, 2019.
Breuel "High Performance Text Recognition Using a Hybrid Convolutional-LSTM Implementation", 2017 14th IAPR International Conference on Document Analysis and Recognition, IEEE, vol. 1, Nov. 9, 2017, pp. 11-16.
Breuel et al, "High-Performance OCR for Printed English and Fraktur Using LSTM Networks"; 2013, 12th International Conference on Document Analysis and Recognition, IEEE, Aug. 25, 2013, pp. 683-687.

(Continued)

*Primary Examiner* — Amandeep Saini
(74) *Attorney, Agent, or Firm* — K&L Gates LLP

(57) ABSTRACT

A method for estimating text heights of text line images includes estimating a text height with a sequence recognizer. The method further includes normalizing a vertical dimension and/or position of text within a text line image based on the text height. The method may also further include calculating a feature of the text line image. In some examples, the sequence recognizer estimates the text height with a machine learning model.

21 Claims, 8 Drawing Sheets

(56) References Cited

OTHER PUBLICATIONS

Espan A-Boquera et al., "Improving Offline Handwritten Text Recognition with Hybrid HMM/ANN Models"; IEEE Transactions on Pattern Analysis and Machine Intelligence, IEEE Computer Society, USA, vol. 33, No. 4, Apr. 1, 2011, pp. 797-779.

Amer et al, "Deep Arabic Font Family and Font Size Recognition", International Journal of Computer Applications, Oct. 1, 2017, pp. 975-8887.

Bunke et al, "Image Processing Methods for Document Image Analysis", Dec. 31, 1997, Handbook of Character Recognition and Document Image Analysis, World Scientific, Singapore, p. 35-38.

\* cited by examiner

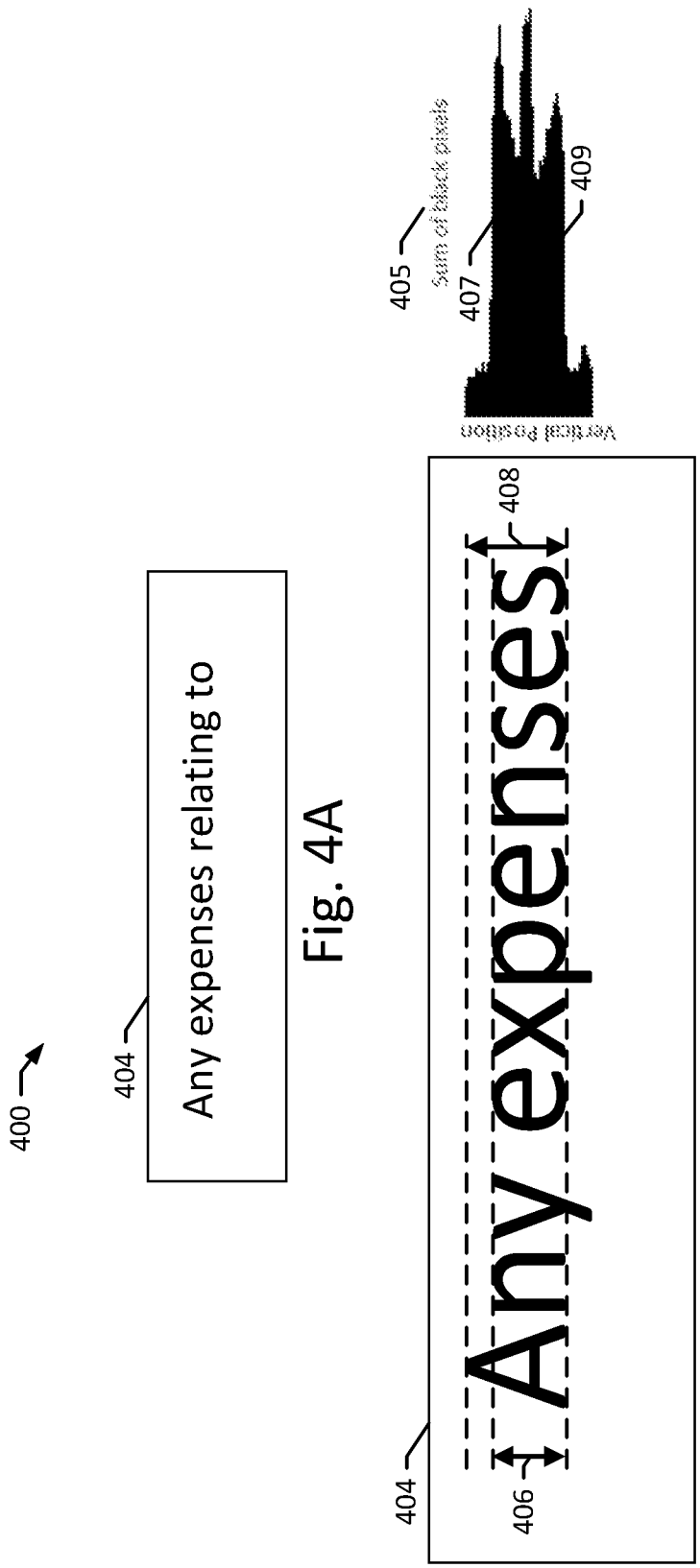

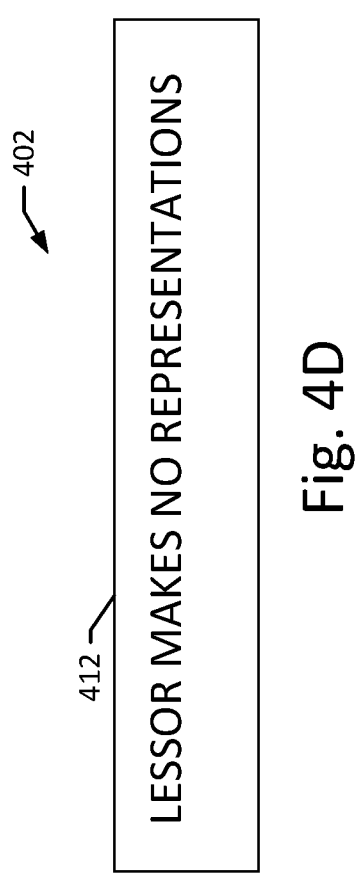
Fig. 4D
LESSOR MAKES NO REPRESENTATIONS — 412
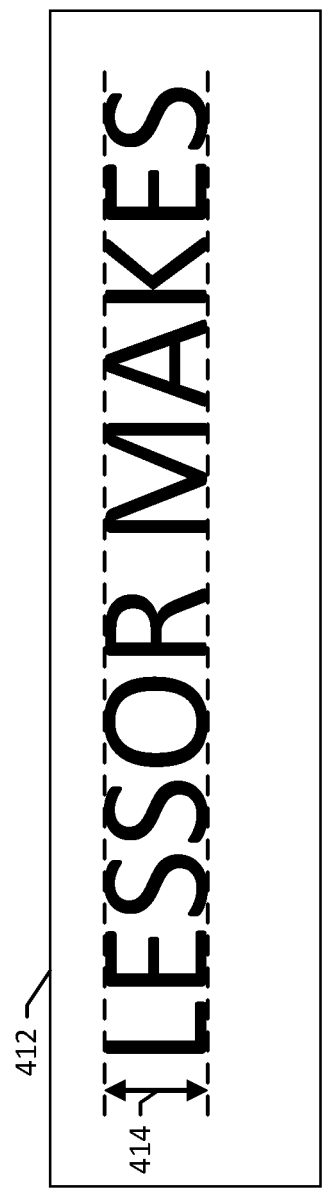
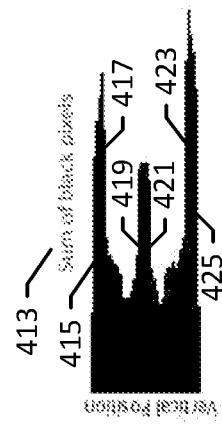
Fig. 4E
Fig. 4F
LANDLORD MAKES NO REPRESENTATIONS — 416

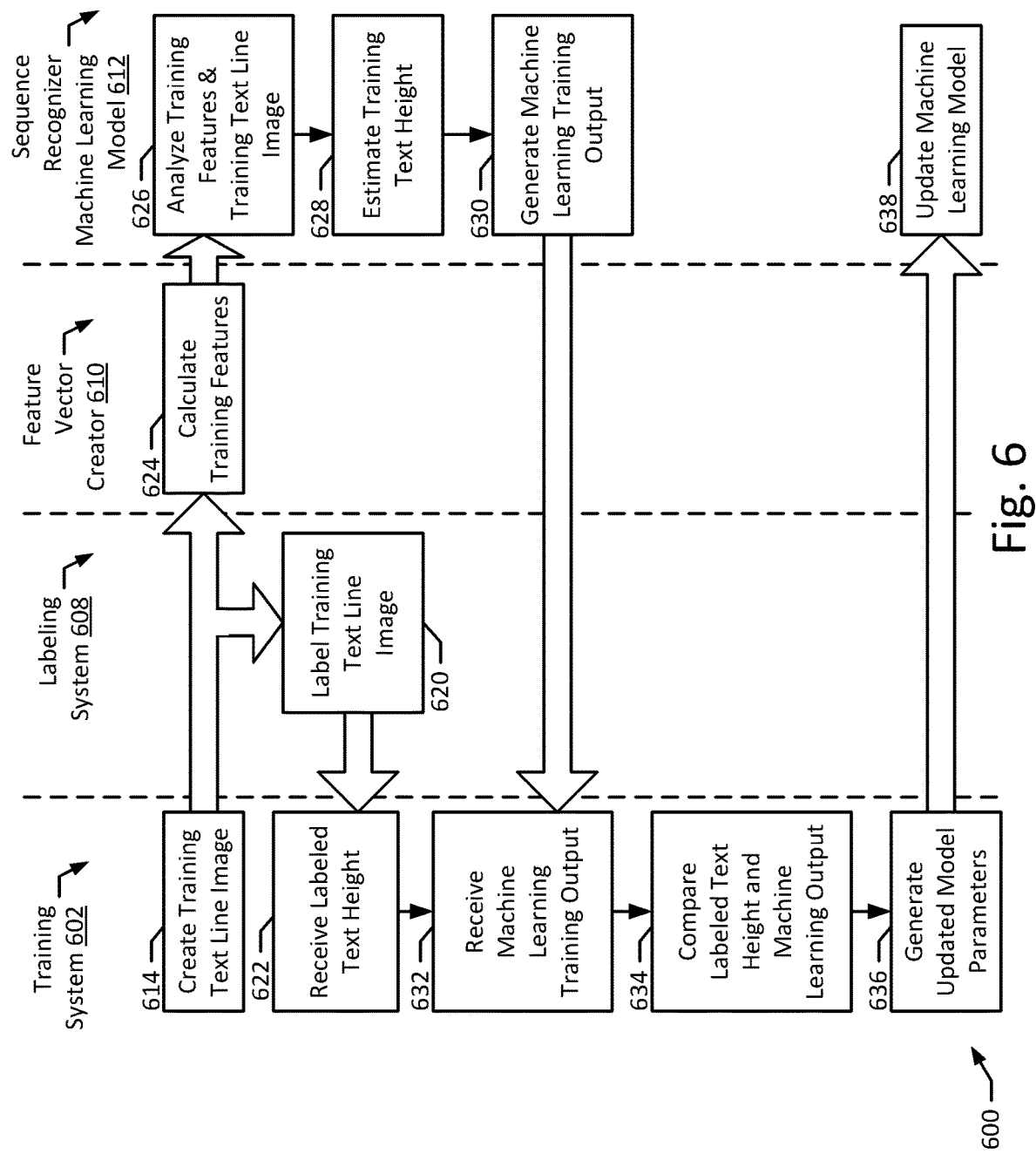

TEXT LINE NORMALIZATION SYSTEMS AND METHODS

CROSS-REFERENCE TO RELATED APPLICATIONS

The present application is a continuation application of U.S. patent application Ser. No. 16/513,094 filed on Jul. 16, 2019, which claims the benefit of U.S. Provisional Patent Application No. 62/700,427 filed on Jul. 19, 2018. The entire content of said applications are hereby incorporated by reference in their entireties.

BACKGROUND

When processing and reviewing documents with an electronic device, the documents may be scanned into or stored as document images. To analyze the documents, it may be necessary for the text contained in document images to be recognized by an optical character recognition (OCR) system. Recognizing the text of the document image may enable further analysis of the document. To accurately recognize the text, the OCR system may need to normalize the text height and the text position in the document image. Normalization may require the text height of each line of text in the document image to be estimated.

SUMMARY

The present disclosure presents new and innovative systems and methods for normalizing text line images. In an example, a computer-implemented method comprises (a) receiving a first text line image associated with a first line of text contained within a document image, (b) estimating a first text height of the first text line image with a sequence recognizer, and (c) normalizing the first text line image based on the first text height.

In another example, the method further comprises calculating a first feature of the first text line image, wherein the sequence recognizer estimates the first text height using the first feature.

In a further example, the method further comprises calculating a second feature of a second text line image associated with a second line of text contained within the document image, wherein the sequence recognizer estimates the first text height using the first feature and the second feature.

In a still further example, the first feature includes a feature chosen from the group consisting of a sum of pixels at a plurality of vertical positions within the first text line image, a gradient of the sum of pixels at a plurality of vertical positions within the first text line image, a statistical moment of a gray value distribution at a plurality of vertical positions of the first text line image, and combinations thereof.

In another example, the second feature includes a second text height of the second text line image.

In yet another example, the method further comprises calculating a third feature of a plurality of text line images associated with a plurality of lines of text contained within the document image, wherein the sequence recognizer estimates the first text height using the third feature.

In a further example, the third feature is a text height of a majority of the plurality of text line images.

In a still further example, the sequence recognizer estimates the first text height with a machine learning model.

In another example, the machine learning model is chosen from the group consisting of a recurrent neural network, a convolutional neural network, a conditional random field model, a Markov model, and combinations thereof.

In a further example, the method further comprises receiving (i) a training text line image associated with a training line of text and (ii) a labeled text height indicating a desired text height corresponding to the training text line image, estimating a training text height of the training text line image, comparing the training text height with the labeled text height to create a training output comparison that identifies one or more errors in the training text height, and updating one or more parameters of the machine learning model based on the training output comparison.

In a still further example, the method further comprises estimating one or both of an upper bound and a lower bound of the first text height.

In yet another example, estimating one or both of the upper bound and the lower bound further comprises predicting a probability that each of a plurality of vertical positions of the first text line image is the upper bound and/or the lower bound.

In a further example, the first text height includes one or more height measures chosen from the group consisting of a lowercase text height measure and a capital text height measure, and combinations thereof, wherein the lowercase text height measure is a measure of a height of one or more lowercase letters in the text, and wherein the capital text height measure is a measure of a height of one or more capital letters in the text.

In another example, the method further comprises estimating a first height measure of the first text line image, determining that the first height measure incorrectly measures the first text height of the first text line image, estimating a second height measure of the first text line image, and calculating a third height measure based on the second height measure and a height measure conversion ratio.

In a further example, determining that the first height measure incorrectly measures the first text height of the first text line image further comprises performing optical character recognition on the first text line image after the first text line image is normalized based on the first height measure and measuring that a confidence measure of the optical character recognition is below a confidence threshold, and the first height measure is a lowercase text height measure, the second height measure is a capital text height measure, and the third text height measure is a lowercase text height measure.

In a still further example, the method further comprises repeating (a)-(c) on a plurality of text line images associated with the document image.

In another example, a system is provided comprising a processor and a memory storing instruction which, when executed by the processor, cause the processor to (a) receive a first text line image associated with a first line of text contained within a document image, (b) estimate a first text height of the first text line image with a sequence recognizer, and (c) normalize the first text line image based on the first text height.

In a further example, the memory contains further instructions which, when executed by the processor, cause the processor to calculate a first feature of the first text line image, wherein the sequence recognizer estimates the first text height using the first feature.

In a still further example, the memory contains further instructions which, when executed by the processor, cause the processor to calculate a second feature of a second text line image associated with a second line of text contained within the document image, wherein the sequence recognizer estimates the first text height using the first feature and the second feature.

In yet another example, the first feature includes a feature chosen from the group consisting of a sum of pixels at a plurality of vertical positions within the first text line image, a gradient of the sum of pixels at a plurality of vertical positions within the first text line image, a statistical moment of a gray value distribution at a plurality of vertical positions of the first text line image, and combinations thereof.

In a further example, the second feature includes a second text height of the second text line image.

In another example, the memory contains further instructions which, when executed by the processor, cause the processor to calculate a third feature of a plurality of text line images associated with a plurality of lines of text contained within the document image, wherein the sequence recognizer estimates the first text height using the third feature.

In a further example, the third feature is a text height of a majority of the plurality of text line images.

In a still further example, the sequence recognizer is configured to estimate the first text height with a machine learning model.

In another example, the machine learning model is chosen from the group consisting of a recurrent neural network, a convolutional neural network, a conditional random field model, a Markov model, and combinations thereof.

In yet another example, the memory contains further instructions which, when executed by the processor, cause the processor to receive (i) a training text line image associated with a training line of text and (ii) a labeled text height indicating a desired text height corresponding to the training text line image, estimate a training text height of the training text line image with the sequence recognizer, compare the training text height with the labeled text height to create a training output comparison that identifies one or more errors in the training text height, and update one or more parameters of the machine learning model based on the training output comparison.

In a further example, the memory contains further instructions which, when executed by the processor, cause the processor to estimate one or both of an upper bound and a lower bound of the first text height.

In a still further example, the memory contains further instructions which, when executed by the processor, cause the processor to estimate one or both of the upper bound and the lower bound of the first text height, to predict a probability that each of a plurality of vertical positions of the first text line image is the upper bound or the lower bound.

In another example, the first text height includes one or more height measures chosen from the group consisting of a lowercase text height measure and a capital text height measure, and combinations thereof, the lowercase text height measure is a measure of a height of one or more lowercase letters in the text, and the capital text height measure is a measure of a height of one or more capital letters in the text.

In a further example, the memory contains further instructions which, when executed by the processor, cause the processor to estimate a first height measure of the first text line image, determine that the first height measure incorrectly measures the first text height of the first text line image, estimate a second height measure of the first text line image, and calculate a third height measure based on the second height measure and a height measure conversion ratio.

In a still further example, the memory contains further instructions which, when executed by the processor, cause the processor to perform optical character recognition on the first text line image and generate a confidence measure after the first text line image is normalized based on the first height measure, determine that the confidence measure is below a confidence threshold. In such examples, the first height measure may be a lowercase text height measure, the second height measure may be a capital text height measure, and the third text height measure may be a lowercase text height measure.

In yet another example, the system is configured to repeat (a)-(c) on a plurality of text line images associated with the document image.

In a further example, a computer readable medium is provided storing instructions which, when executed by one or more processors, cause the one or more processors to (a) receive a first text line image associated with a first line of text contained within a document image, (b) estimate a first text height of the first text line image with a sequence recognizer, and (c) normalize the first text line image based on the line height measure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 4A to 4F illustrate example text line normalization procedures according to example embodiments of the present disclosure.

FIG. 6 illustrates a flow diagram of an example method according, to an example embodiment of the present disclosure.

DETAILED DESCRIPTION OF EXAMPLE EMBODIMENTS

One growing area of application of automated document processing is the automated analysis of legal documents. For example, automated tools, such as those from Leverton GmbH, can be used to automate the process of reviewing large numbers of contracts, leases, title deeds, and other legal or financial documents during a due diligence process. Certain documents are obtained by these systems as document images, e.g., scanned document images or other documents without text information. To automate the analysis of these document images, an important step is to perform optical character recognition on the text of the document image to facilitate automatic review of the contents of the text, e.g., determining document type, named entity identification, agreement term analysis. Before recognizing the text contained within a document image, the document image is typically divided into a plurality of text line images, each containing a line of text from the document image (e.g., text lines 100, 102 of FIGS. 1A and 1B). However, the size of these text line images often varies within the same document because the size of text in the document itself varies. Additionally, neither the height of the text nor the position of the text in each text line image is typically known. For example, a text line image containing large text will be vertically taller than a text line image containing smaller text. Similarly, depending on the text line image separation, the text may be in different positions within each text line image. To properly recognize the text contained in the text line images, optical character recognition (OCR) systems generally require the text line images to be of a fixed size (e.g., the same height) and the position of the text in the text line image to be normalized (e.g., in a certain position or range of positions). To normalize the text line images, additional information is needed related to the text height, e.g., an upper and lower bound of a portion of the text within the image.

Figure 1A:
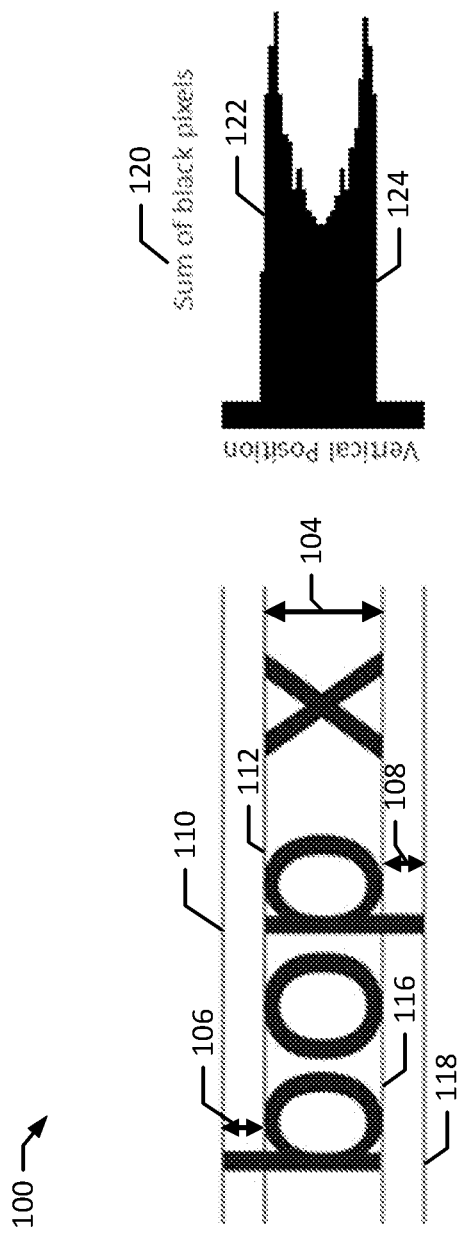
FIGS. 1A and 1B illustrate text line excerpts, according to an example embodiment of the present disclosure.
Figure 1B:
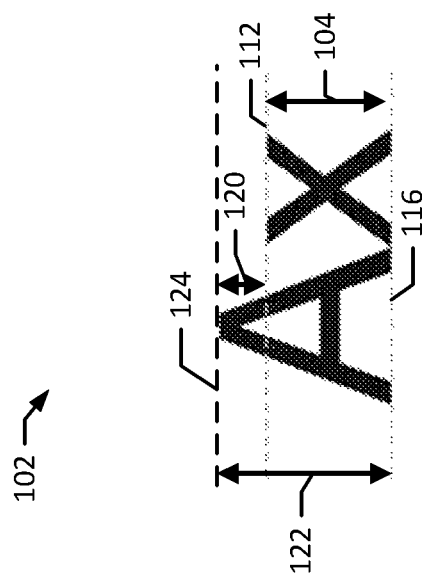

One standard approach to estimate a text height of a text line image is to estimate a lowercase text height measure 104, or the height of one or more lowercase letters in a text line 100, 102. The lowercase text height measure 104 of a text line 100, 102 may include the height of the lowercase letter 'x' as it appears on the text line. For example, the lowercase text height measure 104 may be the height of the region between the upper bound 112 and the lower bound 116, which align with the top and bottom of the letter 'x,' respectively. Other lowercase text height measures 104 are also possible. For example, other lowercase text height measures may be estimated by finding the height of another lowercase letter, such as 'm,' 'n,' 'o,' 'a,' 'u,' or 'c' or multiple lowercase letters. Many common text line normalizations rely on lowercase letters that do not include ascenders or descenders, e.g., letters that do not extend above upper bound 112 or below lower bound 116. For example, a lowercase text height measure may be estimated by finding the height of the letter 'o' in text line 100, e.g., the height of the region between the upper bound 112 and the lower bound 116. As depicted, the height of the letter 'o' may be similar to the height of the letter 'x,'. To estimate a text height, many systems utilize one or more approaches developed by system creators. For example, a text line normalization system may perform a projection (e.g., a horizontal projection) of a text line image 100, 102 by summing up all of the black pixels across a text line image at each vertical projection. Such systems may then apply heuristics to the horizontal projection. For example, FIG. 1A depicts a horizontal projection 120 of the text line that may be used to estimate the upper bound 112 and lower bound 116 by looking for areas of high gradient in the projection. Such areas may be more likely to indicate bounds, as more letters occupy that portion of the text line image. In the horizontal projection 120, the areas of high gradient are areas 122, 124 and correctly indicate the upper bound 112 and lower bound 116, respectively.

However, certain text features may compromise the accuracy of such heuristics. For example, text line 100 contains both ascenders and descenders. Ascenders are portions of lowercase letters that extend above the upper bound of most other lowercase letters. For example, in text line 100, ascenders would include the portions of lowercase letters that extend above the upper bound 112 of the letters 'x', 'o', and 'p' such as the upper portion of the letter 'b'. Descenders are portions of lowercase letters that extend below the lower bound of most other lowercase letters. For example, in the text line 100, descenders would include the portions of lowercase letters that extend below the lower bound 116 of the letters 'x', 'o', and 'b' such as the lower portion of the letter 'p'. Ascenders and descenders can negatively affect the accuracy of heuristic systems for estimating height measures, because the portions that extend into regions 106, 108 dampen the gradients in the projections. Therefore, many conventional systems fail to accurately identify the text height of text line images with many ascenders and descenders. Conversely, certain conventional systems may include heuristics to improve the accuracy of the text line height identification on lines with typical numbers of ascenders or descenders. In operation, these heuristics may be applied to every text line image, causing conventional systems to incorrectly identify the text height of text line images with no ascenders or descenders. Also, for some languages, e.g., French or German, certain characters may even extend higher than ascenders, e.g., the characters 'Á' or 'Ä'.

Capital letters may also compromise the accuracy of heuristic systems configured to estimate lowercase text height measures. Similar to ascenders and descenders, most capital letters extend above the upper bound of most lowercase letters of a text line image 100, 102. For example, in the text line image 102, the capital letter 'A' extends above the upper bound 112 of the letter 'x' into the region 120. Although not depicted in FIGS. 1A, 1B, numerical characters present similar issues for heuristic systems, as most numbers typically extend above the upper bound of most lowercase letters. Like ascenders and descenders, capital letters and numbers dampen the gradient of a horizontal projection and thus compromise the accuracy of heuristic systems in estimating lowercase text height measures.

Further, existing heuristic systems that identify the text height of text line images also generally ignore contextual information available in the document and in other text line images. For example, text line images that are near one another in a document image may be more likely to have the same or similar text heights. In other examples, text line images coming from certain portions of a document may have certain expected text heights (e.g., titles may be expected at the beginning of a document with larger text heights and footnotes may be expected at the bottom of documents with smaller text heights).

One innovative procedure, described in the present disclosure, to solve both of these problems is to use a machine learning model to estimate text heights of text line images. One approach to doing this involves calculating features that correspond to each text line image. The features for one text line image may also include features of other text line images in the same or similar documents. For example, the features for one text line may include a horizontal projection of the text line image and may also include the text heights of other text line images adjacent to the text line image in the document. The features may then be analyzed by a machine learning model to estimate the text height. To train the machine learning model, training text line images may be created that are labeled to indicate the correct text height. The model may then analyze these training text line images to estimate their text heights and the model may be adjusted to improve the accuracy of its text height estimations. Because the model is configured to be trained and updated automatically, rather than manually updated with new heuristics, such a system is also significantly easier to update for new types of documents and typographies. Further, because the system is configured to work with feature vectors, which may include many different types of features, the model is able to integrate new features that may be relevant to certain types of documents and/or typographies fonts, but not others.

Another innovative procedure, described in the present disclosure, is to incorporate new features into a heuristic analysis. For example, conventional systems only attempt to estimate a lowercase text height measure of letters without ascenders or descenders. But, if a line has many ascenders or descenders, it may not be possible to measure such a lowercase text height. Instead, a lowercase text height measure may be estimated by estimating the height of letters with ascenders or descenders, e.g., the letters 'b' (the height of the region between upper bound 110 and lower bound 116) and 'p' (the height of the region between upper bound 112 and lower bound 118). In other implementations, the text height may be estimated as a capital text height measure 122, or the height of one or more capital letters in a text line 100, 102. For example, the text height may be estimated as the capital text height measure 122 of the capital letter 'A' by estimating the height of the region between the upper bound 124 and the lower bound 116 of the text line 102. Other capital text height measures may include estimating the height of the capital letter 'X', 'Z', or 'N', multiple capital letters, or numbers. As an example, a text line containing the text "1234567890" or "JOHN SMITH" may not be accurately identified by conventional systems because there is no indication of the location of the upper bound 112. Therefore, the only available text measure may be a capital text height measure 122. Conversely, it may not be possible to calculate a capital text measure 122 of certain text lines if they do not contain any capital letters. For example, it may not be possible to estimate a text height measure 122 of the text line "ever." In many cases, the capital text height measure 122 may be the same as the lowercase text height measure of a lowercase letter with an ascender, such as the letter 'b.' After calculating one or both of the lowercase text height measure of letters with ascenders or descenders or a capital text height measure, the text height measure may be converted into a lowercase text height measure of a letter free of ascenders or descenders. Another potential feature that may be incorporated is the height of one or more text lines near the text line whose text height is being estimated. For example, heuristics may be designed that incorporate the estimated text height measures of one or more adjacent text line images into the estimate of a text height image. In another example, the text height may be estimated as a majority text height for all of the text height images that came from the same page of a document.

In certain instances, both of these procedures may be combined to improve the accuracy of estimating text height measures. For example, a machine learning model may be trained to incorporate one or more text height measures, such as a lowercase text height measure 104 and a capital text height measure 122. After being trained, the model may select between the two text height measures based on the accuracy or based on one or more features of the text line. The machine learning model may also incorporate contextual information, e.g., information about nearby text lines or text lines on the same page.

Figure 2:
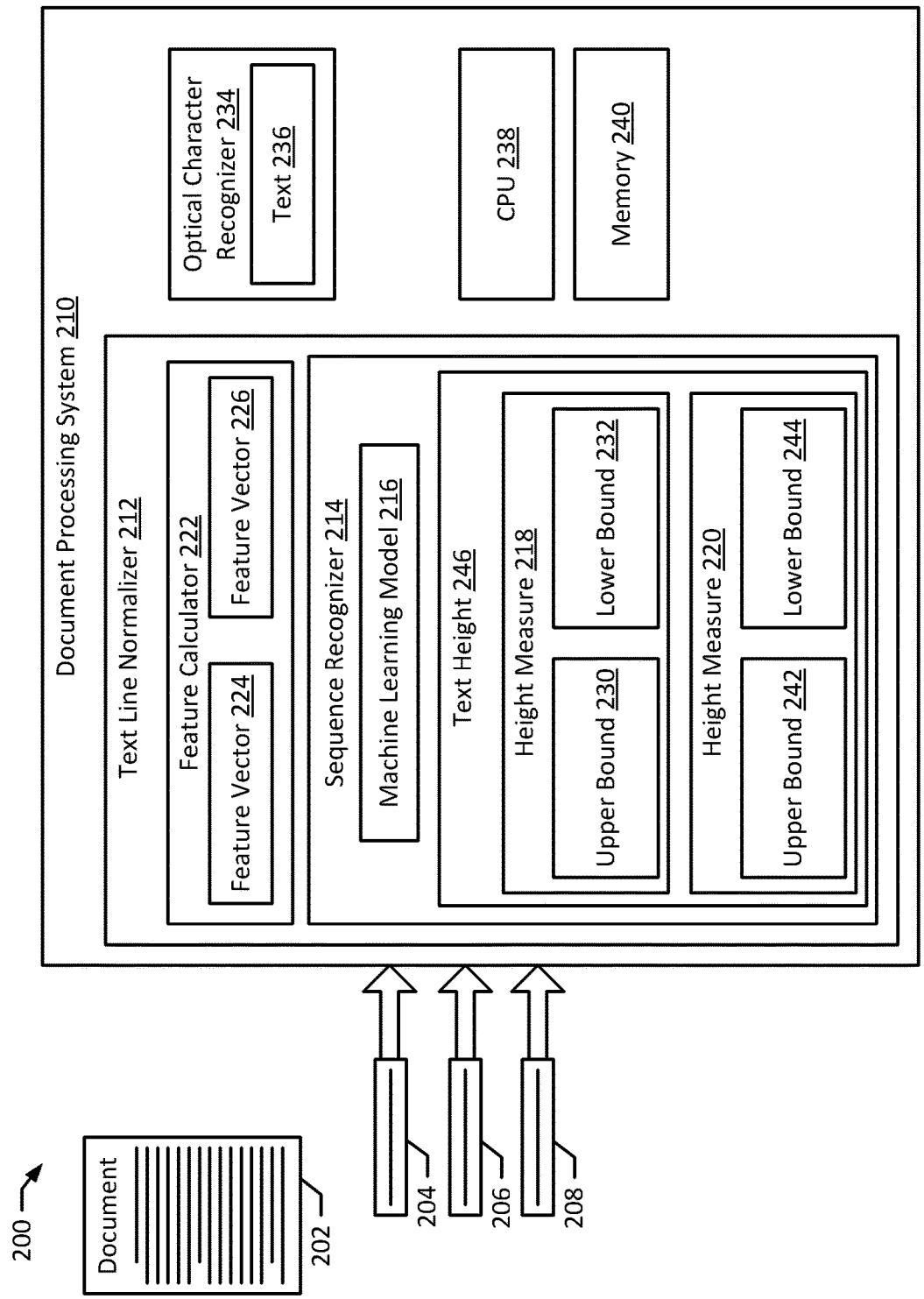
FIG. 2 illustrates a document processing system, according to an example embodiment of the present disclosure.

FIG. 2 depicts a document processing system 200, according to an example embodiment of the present disclosure. The document processing system 210 includes a document 202, text line images 204, 206, 208, and a document processing system 210. The document processing system 210 includes a CPU 238, a memory 240, a text line normalizer 212, and an optical character recognizer 234 including a text 236. The text line normalizer 212 includes a feature calculator 222, and a sequence recognizer 214. The feature calculator 222 includes feature vectors 224, 226. The sequence recognizer 214 includes a machine learning model 216 and an estimated text height 246, including height measures 218, 220. The height measures 218, 220 may also include an upper bound 230, 242 and a lower bound 232, 244 corresponding to the region whose height is estimated by the height measures 218, 220.

The document processing system 210 may be configured to receive text line images 204, 206, 208. The text line images 204, 206, 208 may be associated with a document 202. For example, text line images 204, 206, 208 may come from the same page of the document 202 and, in certain examples, may be adjacent to one another within the document. In some embodiments, the document 202 and/or the text line images 204, 206, 208 may be stored on the memory 240 after being received by the document processing system 210. The document 202 may be received from a document server configured to store multiple documents. The document 202 may be a document image, such as a scanned image of a paper document, or may include another document file lacking text information.

The document 202 may be intended for automated analysis, as described above. For example, the document 202 may be one or more of a lease agreement, a purchase sale agreement, a title insurance document, a certificate of insurance, a mortgage agreement, a loan agreement, a credit agreement, an employment contract, an invoice, a financial document, and an article. The document 202 may be analyzed to assess one or more legal or business risks, such as contract exposure, or to perform due diligence on a real estate portfolio. Although depicted in the singular, in some embodiments the document processing system may be configured to receive and process text line images 204, 206, 208 associated with more than one document 102 at a time. For example, the document processing system 210 may be configured to receive text line images 204, 206, 208 from multiple documents 202 of the same type (e.g., residential leases) or may be configured to receive text line images 204, 206, 208 from multiple documents 202 of multiple types (e.g., residential leases and commercial leases).

The text line images 204, 206, 208 may contain a single line of text extracted from a document 202. In certain embodiments, the text line images 204, 206, 208 may be extracted from the same document 202, or may be extracted from multiple documents 202 (e.g., documents of the same document type). The text line images 204, 206, 208 may be extracted before being received by the document processing system 210. In other embodiments, the document processing system 210 may be configured to receive the document 202 and to further extract the text line images 204, 206, 208.

The document processing system 210 may be configured to receive text line images 204, 206, 208 and/or documents 202 for further processing to normalize the text lines contained with the text line images 204, 206, 208 corresponding to the documents 202. The feature calculator 222 may be configured to receive the text line images 204, 206, 208 and calculate features associated with the text line images 204, 206, 208. The feature calculator 222 may also collect or calculate features associated with other text line images 204, 206, 208 (e.g., features associated with adjacent or nearby text line images 204, 206, 208). In some implementations, the feature calculator 222 may also collect the features into feature vectors 224, 226, each associated with one text line image 204, 206, 208. For example, feature vector 224 may be associated with text line image 204 and feature vector 226 may be associated with text line image 206. Although certain embodiments discussed herein may describe the document processing system 210 as analyzing an individual text line image 204, 206, 208 or as analyzing a plurality of text line images 204, 206, 208, it should be understood that each of these examples are expressly contemplated in regards to each discussed embodiment, unless expressly stated otherwise.

The sequence recognizer 214 may be configured to analyze the text line images 204, 206, 208 to estimate text heights 246. For example, the sequence recognizer 214 may analyze the text line images 204, 206, 208 on their own or may additionally analyze one or more features corresponding to the text line images 204, 206, 208. These features may be stored and processed on their own, or may be contained within a feature vector 224, 226. As explained further below, these features may include one or more sequences of vertical pixel position measurements. In some embodiments, the sequence recognizer 214 may use a machine learning model 216 to analyze the text line images 204, 206, 208 and/or the features to estimate the height measures 218, 220. The machine learning model 216 may be trained for certain applications. For example, the machine learning model 216 may be trained to estimate the text height 246 of text line images 204, 206, 208 coming from particular types of documents 202, e.g., text lines containing particular typographies, written in particular languages, and/or containing particular text special cases. The machine learning model 216 may include a neural network such as a recurrent neural network or a convolutional neural network or another type of machine learning model such as a conditional random field model and a Markov model.

The sequence recognizer 214 and/or the machine learning model 216 may evaluate one or more features of the feature vectors 224, 226 to estimate a text height 246 of a text line image 204, 206, 208. For example, the sequence recognizer 214 may analyze the feature vector 224, 226 in combination with the text line image 204, 206, 208 to estimate the text height 246, as described in further detail below. In other embodiments, the sequence recognizer 214 may analyze the text line image 204, 206, 208 and may not analyze the feature vector 224, 226 when estimating the text height 246. In still further embodiments, the sequence recognizer 214 may analyze a sequence of vertical pixel positions of the text line image 204, 206, 208 and estimate, at one or more of the vertical pixel positions, the likelihood that the vertical pixel position is an upper bound, a lower bound, or neither. As described above, certain features of a text line image 204, 206, 208 may make particular strategies for recognizing line height less effective (e.g., text line images containing inordinately large proportions of ascenders, descenders, capital letters, and numbers). To address this issue, the machine learning model 216 may estimate different height measurements 218, 220 for text lines with different features. For example, if a text line image 204, 206, 208 does not have any lowercase letters, it may not be possible to find a lowercase text height measure 104 of the text line image 204, 206, 208, because there are no lowercase letters. Instead, the machine learning model 216 may estimate a capital text height measure 122 of the text line image 204, 206, 208. In certain embodiments, the capital text height measure 122 may have to be converted into a lowercase text height measure 104 to estimate a text height 246 that can be used to properly normalize the text line image 204, 206, 208. Accordingly, the sequence analyzer 214 or the machine learning model 216 may be configured to convert the capital text height measure 122 into a lowercase text height measure 104. For example, the capital text height measure 122 may be converted by (1) using a composite text height conversion ratio derived from the average ratio between the lowercase text height measure 104 and the capital text height measure 122 for commonly-used fonts, (2) determining the font used in the text line image 204, 206, 208 and using a text height conversion ratio for the used font, and/or (3) being provided the font (e.g., from document 202 metadata, from a user, or from a font detection process elsewhere in the document processing system 210) and using a text height conversion ratio for the provided font. Such conversion ratios may also be used to convert a lowercase text height measure 104 into a capital text height measure 122. Further, similar techniques may also be used to convert between different types of lowercase text height measures 104 and between different types of capital text height measures 122. In other implementations, the optical character recognizer 234 may be configured to use more than one height measure 218, 220 to estimate the text height 246. For example, the optical character recognizer 234 may be configured to use both the lowercase text height measure 104 and the capital text height measure 122 of a text line 204, 206, 208. In such configurations, the sequence recognizer 214 may be configured to estimate both the lowercase text height measure 104 and the capital text height measure 122 of the text lines 204, 206, 208. The sequence recognizer 214 may also estimate upper bounds 230, 242 and lower bounds 232, 244 for each height measure 218, 220, e.g., for the lowercase text height measure 104 and the capital text height measure 122.

As another example, certain types of documents 202 may have contextual information useful in recognizing a height measure 218, 220 based on the text height 246 of adjacent or nearby text line images 204, 206, 208. For example, the text height 246 of adjacent lines may typically remain the same throughout articles or longer documents. In another example, text heights 246 for certain regions of a page of a document 202 may be differently-sized (e.g., footnotes of the document 202 may have smaller text lines). Therefore, in such embodiments, the machine learning model 216 may be configured to incorporate such contextual information to estimate a text height 246 or height measure 218, 220 based on the text height 246 or height measure 218, 220 of nearby text line images 204, 206, 208. In a third example, a text height 246 or height measure 218, 220 of a text line 206 may be based on a text height 246 or height measure 218, 220 of a majority of the text lines 204, 208 on the same page or in the same section as the text line 206.

Depending on the implementation, the text height 246 may be presented according to various implementations. In some embodiments, the text height 246 may only include a single height measure 218, 220, such as a lowercase text height measure 104 or a capital text height measure 220. In other embodiments, the text height 246 may include more than one text height measure 218, 220 (e.g., both a capital text height measure 122 and a lowercase text height measure, multiple capital text height measures 122, and/or multiple lowercase text height measures 104). In still further embodiments, the sequence recognizer may determine more than one text height measure 218, 220 when estimating a text height 246, but may consolidate the multiple text height measures 218, 220 into a single composite text height measure. The specific types of the height measure 218, 220 contained in the text height 246 may vary according to the type of normalization required by the optical character recognizer 234.

The upper bounds 230, 242 and lower bounds 232, 244 may indicate the vertical positions of the text line image 204, 206, 208 delimiting the height estimated by the height measures 230, 220. For example, the upper bounds 230, 242 may indicate an estimated vertical position of the top of the region whose height is estimated by the height measures 218, 220, and the lower bounds 232, 244 may indicate an estimated vertical position of the bottom of the region whose height is estimated by the height measures 218, 220. Accordingly, the upper bounds 230, 242 and lower bounds 232, 244 may vary depending on the specific height measure estimated. For example, if height measure 218 is a lowercase text height measure 104 of the letter 'x', the upper bound 230 may estimate the vertical position of the upper bound 112 and the lower bound 232 may estimate the vertical position of the lower bound 116. In another example, if the height measure 220 is an estimate of a capital text height measure 120 of the letter 'A', the upper bound 242 may estimate the vertical position of the upper bound 124 and the lower bound 244 may estimate the vertical position of the lower bound 116. In still further embodiments, the upper bounds 230, 242 and lower bounds 232, 244 may estimate the vertical positions of the upper and lower bounds 110, 118 of all text contained within a text line image 204, 206, 208, including ascenders and descenders.

The upper bounds 230, 242 and lower bounds 232, 244 may also be formatted in several ways. For example, the upper bounds 230, 242 and lower bounds 232, 244 may contain a single estimated vertical position for each upper and lower bound of the height measure 218, 220. For example, the upper bound 230, 242 may contain the vertical position predicted to be the most likely location of the upper bound of the height measure 218, 220. Similarly, the lower bound 232, 244 may contain the vertical position predicted to be the most likely location of the lower bound of the height measure. Such an implementation may provide for simpler text line normalization, but may be less suitable for use with documents 202 that contain a greater number of difficult text lines (e.g., text lines with a lot of ascenders, descenders, numbers, and capital letters). In another implementation, the upper bounds 230, 242 and lower bounds 232, 244 may contain a prediction, for a plurality of vertical positions of the text line image 204, 206, 208, of the likelihood that each vertical position is an upper bound and/or lower bound of the height measure 218, 220. For example, the upper bound 230, 242 may contain a prediction of the likelihood that each of a plurality of vertical positions is the upper bound of the height measure 218, 220. Similarly, the lower bound 232, 244 may contain a prediction of the likelihood that each of a plurality of vertical positions is the lower bound of the height measure 218, 220. This type of implementation may be comparatively more complicated, but may also provide more information regarding other potential upper and lower bounds for the height measure 218, 220. For example, if the most likely upper and lower bound positions for a particular text line 202 suggest that the height measure 218 of the text line image 202 is unusually larger than that of a nearby text line image 206, the sequence recognizer 214 may determine that the height measure 218 was incorrectly recognized based on the most likely upper bound and lower bound positions. To remedy this, if the upper bound 230 and lower bound 232 also contain predictions for alternative vertical positions, the sequence recognizer 214 may correct the height measure 218 to use other candidate upper bound and lower bound positions that correct the height measure 218 to be more similar to the corresponding height measure of the nearby text line image 206, or may evaluate the next-most-likely vertical positions contained in the upper bound 230 and/or the lower bound 232.

Using the text height 246, the text line normalizer 212 may normalize the corresponding text line image 204, 206, 208. For example, the document 202 may have lines of text with different sizes and typographies. For example, the main body text of the document 202 may have text of a medium size (e.g., 12-point font), the title text of the document 202 may have text of a large size (e.g., 36-point font), and footnote text of the document 202 may have text of a smaller size (e.g., 8-point font). As described above, in certain implementations, for the optical character recognizer 234 to correctly recognize the text 236, the text line images 204, 206, 208 may need to be normalized such that the text line images are all the same size and/or have the text (e.g., the lowercase text height measure 104 or the capital text height measure 122) positioned in the same place of the text line image 204, 206, 208. The text line normalizer 212 may normalize the text line image 204, 206, 208 using the upper bound 230, 242 and the lower bound 232, 244. For example, when normalizing a text line image 204, 206, 208, the text line normalizer 212 may resize the text line image 204, 206, 208 such that the upper bound 230, 242 and lower bound 232, 244 are in the same location of the normalized text line image. The text line normalizer 212 may also crop, stretch, or otherwise manipulate the text line image 204, 206, 208 in order to size and position the text line accordingly.

After the text line images 204, 206, 208 are standardized based on the height measures 218, 220, the text line images 204, 206, 208 may be processed by the optical character recognizer 234 to recognize a text 236 contained within the text line images 204, 206, 208. This text may comprise the text from a plurality of text line images 204, 206, 208 and may correspond to a text of the document 202. After recognizing the text 236, the document processing system 210 may then perform automated analysis of the document 202 as described above. In certain implementations, the optical character recognizer 234 may benefit from the normalized text lines and provide better results than text lines that have note been normalized. For example, the optical character recognizer 234 may be implemented as a machine learning model that is trained on text line images that have been normalized in a certain way. In such implementations, it is often important that the text lines being recognized by the optical character recognizer 234 be normalized in the same way as the text line images used to train the machine learning model of the optical character recognizer 234. The CPU 238 and the memory 240 may implement one or more of the document processing system 210 features and/or text line normalizer 212 features, such as the feature calculator 222 and the sequence recognizer 214. For example, the memory 240 may store instructions which, when executed by the CPU 238 may perform one or more of the operational features of the document processing system 210.

The system 200 may be implemented as one or more computer systems, which may include physical systems or virtual machines. For example, the text line normalizer 212 and the optical character recognizer 234 may be implemented by the same computer system. These computer systems may be networked, for example, by a network such as a local area network or the Internet. Alternatively, the text line normalizer 212 and the optical character recognizer 234 may be implemented as separate computer systems. In such examples, the CPU 238 may be implemented as a plurality of CPUs and the memory 240 as a plurality of memories.

Figure 3:
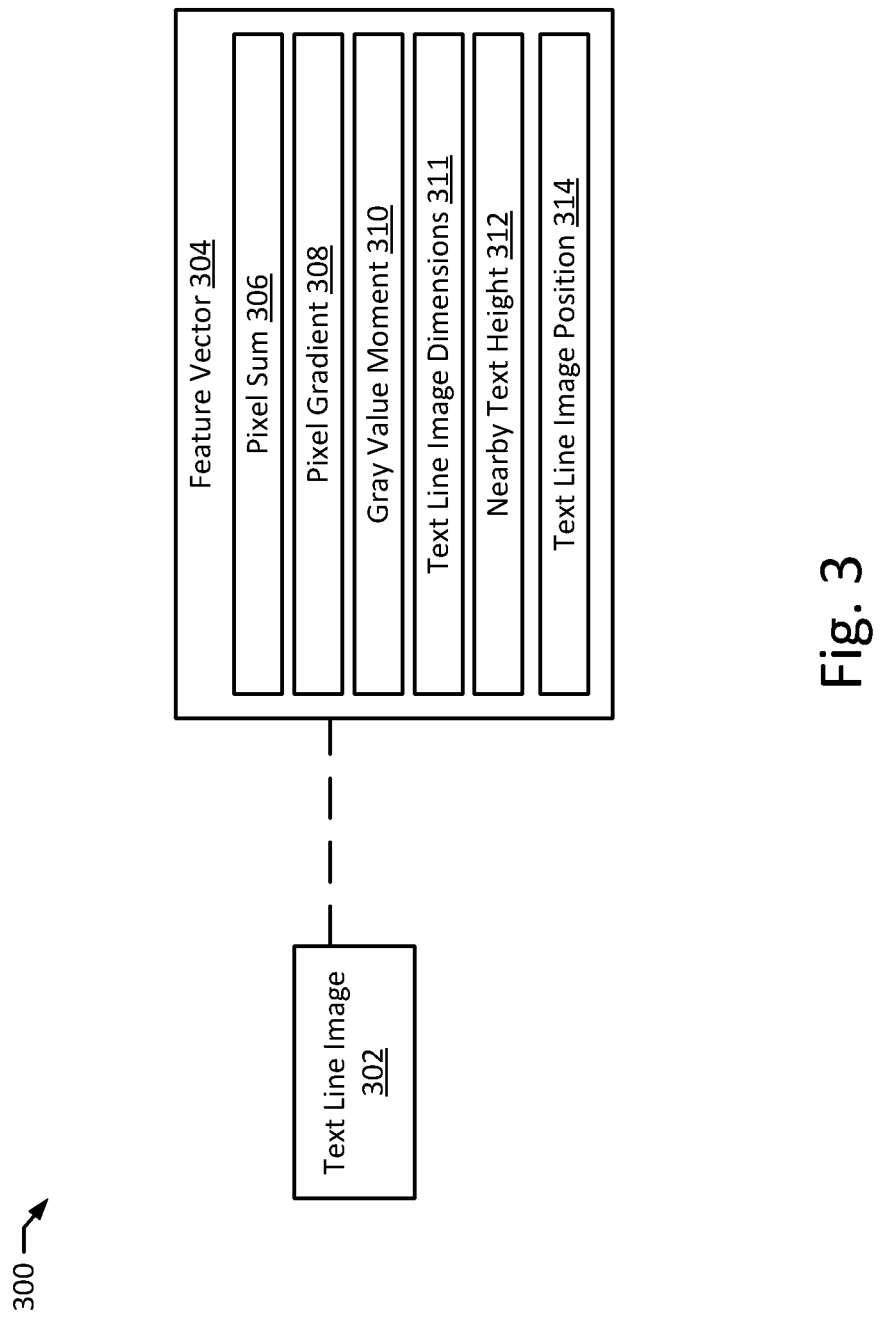
FIG. 3 illustrates a feature vector association, according to an example embodiment of the present disclosure.

FIG. 3 depicts a feature vector association 300 according to an example embodiment of the present disclosure. The feature vector association 300 includes a feature vector 304 associated with a text line image 302. In some embodiments, as described above, the feature vector 304 may be used to estimate a text height 246 of a text line image 204, 206, 208. For example, the feature vectors 206, 220 may be example embodiments of the feature vectors 224, 226 of the system 200 and the text line image 302 may be an example embodiment of the text line images 204, 206, 208. In some embodiments, the feature vector 304 may be associated with a text line image 302. The association may indicate that the feature vector 304 was created, at least in part, from features derived from the text line image 302.

The feature vector 304 may contain one or more features. These features may indicate one or more aspects of the text line image 302, one or more nearby text line images, and the document 202 from which the text line image 302 originated. For example, the feature vector 304 contains a pixel sum 306, a pixel gradient 308, a gray value moment 310, text line image dimensions 311, a nearby text height 312, and a text line image position 314. One or more of the features, e.g., the pixel sum 306, pixel gradient 308, and gray value moment 310, may be calculated for a plurality of vertical positions of the text line image 302, as described further below. A sequence recognizer 214 may analyze the features within the feature vector 304 to estimate a text height 246 of the text line image 302 for use in normalizing the text line image 302.

The pixel sum 306 may include a sum of all of the black or darkened pixels at each of a plurality of vertical positions of the text line image 302. For example, the pixel sum 306 may be determined by summing all of the pixels values horizontally for each vertical pixel of the text line image 302. The pixel gradient 308 may be a calculation of a difference of the pixel sum 306 at each vertical comparison, as compared to nearby vertical positions. For example, the pixel gradient 308 may be calculated by first calculating the pixel sum 306 of the text line image 302. Then, for each vertical position other than the first and last vertical position, the pixel gradient 308 may be calculated by calculating the difference of the pixel sum at the vertical position against the average value of the pixel sum at each of the neighboring positions. In another example, the pixel gradient 308 may be implemented as a count of how many pixels at each vertical position in the text line image 302 have gray values that differ from the gray values of the pixels at above and/or below vertical positions. The gray value moment 310 may include a statistical variance or other statistical moment of the gray value distribution for the pixels at a particular vertical position of the text line image 302. The text line image dimensions 311 may include one or more dimensions of the text line image 302. For example, the text line image dimensions 311 may include a measure of the length of the text line image 302 (e.g., the length of the text line image in centimeters, inches, or pixels). Longer text line images 302 are significantly more likely to include ascenders and descenders, and therefore may require a different strategy or machine learning model in order to accurately estimate the text line height. The text line image dimensions 311 may also include a measure of the height of the text line image (e.g., the height of the image in inches, centimeters, or pixels). In certain embodiments, the text line image height may be provided as a ratio of the height of the text line image to the width of the text line image. In either implementation, a taller text line image may indicate that the text line image 302 is more likely to include ascenders and/or descenders and may therefore require a different text line height estimation technique.

The nearby text height 312 may include an indication of the text height 246 and/or height measures 218, 220 of one or more text line images 204, 206, 208 near the text line image 302. For example, the nearby text height 312 may indicate the text height 246 and/or height measures 218, 220 of a text line that is (i) adjacent to the text line image 302, (ii) located in the same section of a document 202 as the text line image 302, and/or (iii) located on the same page of the document 202 as the text line image 302. In other implementations, the nearby text height 312 may include a measure of the text height of the majority of the text lines on the same page as the text line image 302. The text line image position 314 may include an indication of the position of the text line image 302 within the text 236 from which the text line image 302 originated. For example, the text line image position 314 may include an indication of (i) the page number of the document 202 that the text line image 302 came from, (ii) the position on the page where the text contained in the text line image 302 is located, and/or (iii) the section of the document 202 at which the text line image 302 is located.

In some embodiments, the features may be calculated and assembled into the feature vector 304 by a feature calculator 222. In creating the feature vector 304, the feature calculator 222 may analyze the pixels of the text line image 302, and may perform one or more horizontal projections as described above. The feature calculator 222 may also access and manipulate information created in connection with other text line images 204, 206, 208. For example, the feature calculator 222 may access the text height 246 of nearby text line images in order to create the nearby text height 312. In other embodiments, the features may be calculated without being assembled into a feature vector 304 by the feature calculator 222. In such embodiments, the features may be analyzed on their own to estimate the text height 246, according with analyses similar to those discussed in the present disclosure regarding feature vectors 304. In embodiments including a feature vector 304, the feature vector 304 may be implemented as a data structure that collects and stores the features together, along with storing the association to the text line image 302.

FIGS. 4A to 4F depict example text line normalization procedures 400, 402 according to example embodiments of the present disclosure. In some embodiments, the procedures 400, 402 may be performed according to a method for normalizing the text line images 204, 206, 208 for future analysis by an optical character recognizer 234. As described in greater detail below, the steps performed in conjunction with the procedure 400 may be performed by the text line normalizer 212.

FIG. 4A depicts a text line image 404 containing the text "Any expenses relating to". For clarity, the text line image 404 is only depicted as containing a portion of a text line. As depicted, the text line image 404 may have come from a document 202, which may be a legal document, such as a lease agreement between a landlord and a tenant. For example, the text line image 404 may have come from the body of a lease agreement and may depict the text associated with a term of the agreement. FIG. 4B is an enlarged depiction of a portion of the text line image 404, showing the lowercase text height measure 406 and the capital text height measure 408 of the text line image 404. In some embodiments, the text line image 404 may be processed by an optical character recognizer 234 that requires text line images to be normalized, as described above. For example, the optical character recognizer 234 may require all of the text line images to be normalized to a particular size. As depicted, the text within the text line image 404 may be too large to be accurately processed by the optical character recognizer 234. For example, one or both of the lowercase text height measure 406 and the capital text height measure 408 may be large and may need to be normalized for the optical character recognizer 234 to accurately recognize the text. Additionally, as depicted, the text within the text line image 404 may not be centered vertically within the text line image 404 and the optical character recognizer 234 may require text line images to be normalized with the text vertically centered.

During the text line image normalization process, the text line image 404 may be analyzed by a text line normalizer 212. A feature calculator 222 may calculate features and create a feature vector 224, 226, 304 associated with the text line image 404. For example, as discussed above, the feature vector 224, 226, 304 may contain a pixel sum 306, pixel gradient 308, or gray value moment 310 of the text line image 404. As a further example, FIG. 4B includes a horizontal projection 405 of the sum of black pixels (e.g., a pixel sum 306) of the text line image 404. The feature vector 224, 226, 304 may also contain a nearby text height 312 and an indication of the text line image position 314 within the document 202.

Once the feature vector 224, 226, 304 has been created, a sequence recognizer 214 may then analyze one or both of the text line image 404 and the feature vector 224, 226, 304 to estimate a text height 214, 218 of the text line image 404. For example, as the text in the text line image 404 does not contain many ascenders, descenders, or capital letters, conventional text line image height finding methods may successfully estimate the lowercase text height measure 406. For example, the sequence recognizer 214 may estimate the text height 246 using the horizontal projection 409 of the sum of black pixels of the text line image 404 from the feature vector 224, 226, 304. The sequence recognizer 214 may identify one or more areas of high gradient 407, 409 in the horizontal projection. These areas of high gradient 407, 409 indicate vertical positions where the sum changes quickly and suggest the location of an upper bound and/or lower bound of a height measure 218, 220. Based on the areas of high gradient 407, 409, the sequence recognizer 214 may estimate the lowercase text height measure 406 and use it to estimate the text height 246. In typical implementations, the optical character recognizer 234 may require the text line image 404 to be normalized by lowercase text height measure 406 (e.g., the optical character recognizer 234 may require text line images with a specific lowercase text height measure, such as a specific lowercase text height measure of letters without ascenders or descenders). Therefore, the sequence recognizer 214 may estimate the lowercase text height measure 406 of the letter 'x'. In other embodiments, the optical character recognizer 234 may require the text line image 404 to be normalized by capital text height measure 408. The estimated text height 214, 218 may include an estimation of the vertical positions within the text line image 404 corresponding to the estimated upper and lower bounds of the required text height measure.

The text line normalizer 212 may then normalize the text line image 404 using one or more height measures 218, 220 of the text height 246. For example, the text line normalizer 212 may crop, resize, or otherwise manipulate the text line image 404 such that the height measure 218, 220 aligns with the requirements of the optical character recognizer 234. For example, FIG. 4C depicts the normalized text line image 410, which has been resized to be smaller and conform to the requirements of the optical character recognizer 234. For example, if the optical character recognizer 234 has specific lowercase text height measure requirements for the letter 'x' and the lowercase text height measure 406 is too large, the text line image 404 may be resized smaller to form the normalized text line image 410, as shown. Additionally, the text line normalizer 212 may use the estimated upper and lower bounds of the text height measure to reposition the text in the text line image as required by the optical character recognizer. For example, the text within the normalized text line image 410 has been repositioned so it is vertically centered.

FIG. 4D depicts another text line image 412, from the same document 202 as the text line image 404. As shown, the text line image 412 only contains capital letters and may have come from nearby the text line image 404 (e.g., different portion of the same page as the text line image 404). As depicted, the text contained within the text line image 412 is the same size as the text contained within the text line image 404 and is similarly not vertically centered. As with text line image 404, the text line image 412 may be processed by an optical character recognizer 234 that requires text line images to be normalized to a certain text height and with the text vertically within the text line image to be accurately processed by the optical character recognizer 234. Further, the feature calculator may create a feature vector 224, 226 associated with the text line image 412, containing the same or similar features as the feature vector 304 associated with the text line image 302, such as the horizontal projection 413 of the sum of black pixels (e.g., a pixel sum 306) at each vertical position of the text image 412.

Once the feature vector 224, 226, 304 has been created, the sequence recognizer 214 may analyze the text line image 412 and the feature vector 224, 226, 304 to estimate a height measure 218, 220 of the text line image 412. However, unlike the text line image 404, the text line image 412 is all capital letters and therefore conventional methods for estimating lowercase text height measures may not be available. For example, the horizontal projection 413 includes multiple areas of high gradient 415, 417, 419, 421, 423, 425, none of which correspond to upper or lower bounds of a lowercase text height. Thus, instead of using conventional methods, the sequence recognizer 214 may estimate a capital text height 414 of the text line image 412. For example, the areas of high gradient 415, 425 respectively correspond to the upper bound 230, 242 and lower bound 232, 244 of the capital text height measure 414. In other implementations, the sequence recognizer 214 may analyze one or more of the pixel sum 306, pixel gradient 308, gray value moment 310, and text line image dimensions 311 to estimate the capital text height 414 using heuristics as described above. Additionally or alternatively, the machine learning model 216 may be trained to estimate a height measure 218, 220 of text line images 404, 412 with all or mostly capital letters and/or numbers. After the capital text height 414 is estimated, if the optical character recognizer 234 requires text line images normalized by a lowercase text height measure 104, the sequence recognizer 214 may convert the capital text height 414 to a lowercase text height measure 104 of the text line image 412, using methods similar to those described above. Then, the text line normalizer 212 may reduce the size and adjust the positioning of the text line image 412 as necessary in order to create the normalized text line image 416

(depicted in FIG. 4F) that the optical character recognizer 234 is capable of accurately processing.

In another example, the sequence recognizer (including, in some embodiments, the machine learning model 216) may additionally or alternatively use a nearby text height 312 and/or a text line image position 314 from the feature vector 224, 226, 304. For example, the nearby text height 312 may indicate the lowercase text height measure 406 corresponding to the text line image 404 or a lowercase text height measure 406 of a majority of the text line images on the same page as the text line image 412. In some embodiments, the text line image position 314 may indicate that the text line images 404, 412 are from similar sections of the document 202 (e.g., both text line images originate near the middle of the same page and are thus likely to have the same text height). Such an indication from the text line image position 314 may indicate that the text line image 412 is likely to have the same or similar line height as the text line image 404. Thus, the machine learning model and/or the sequence recognizer 214 may incorporate the lowercase text height measure 406 into the estimate of the height measure 218, 220 of the text line image 412.

Figure 5:
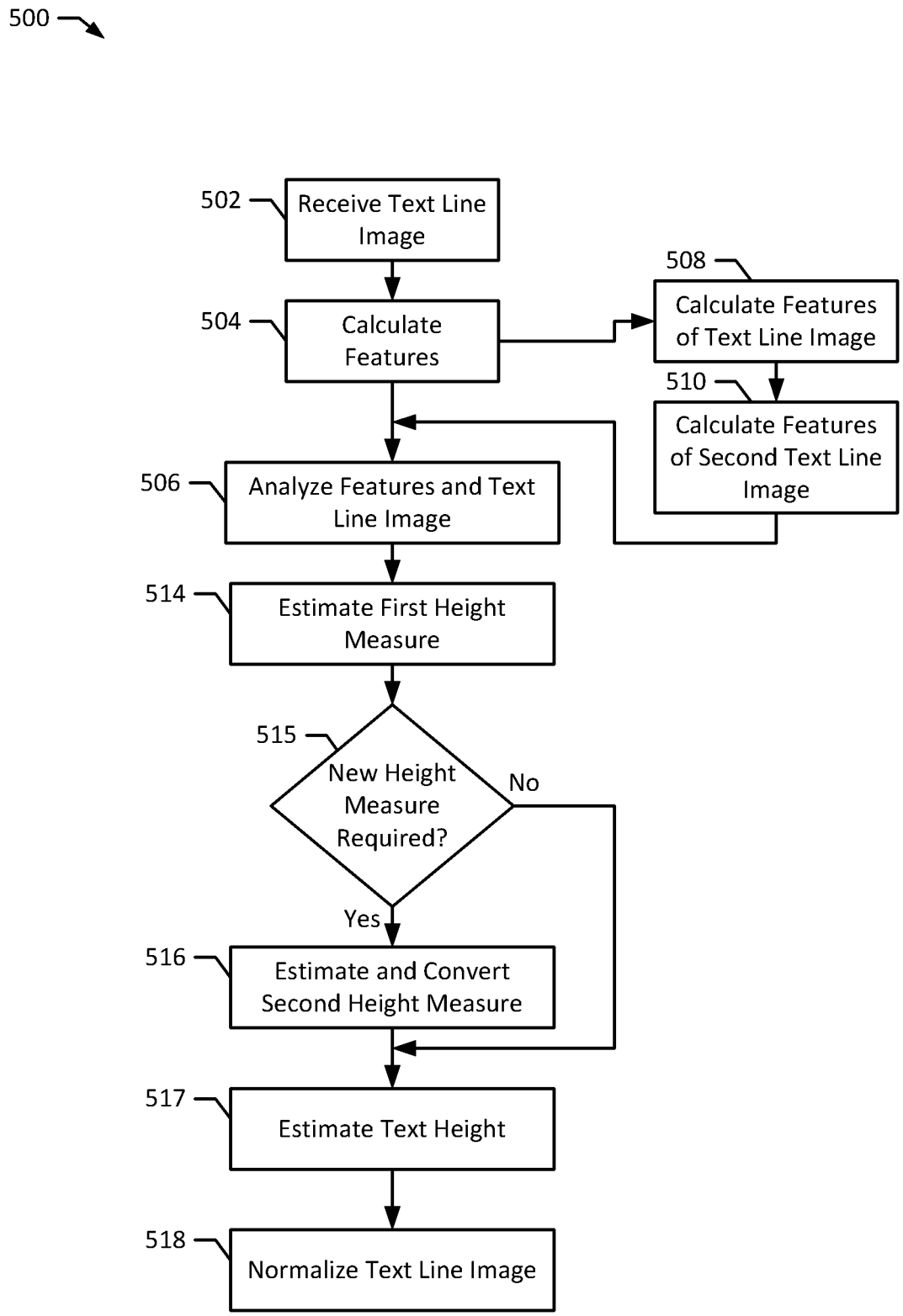
FIG. 5 illustrates a flow chart of an example method, according to an example embodiment of the present disclosure.

FIG. 5 depicts a flow chart of an example method 500 according to an example embodiment of the present disclosure. The method 500, when executed, may be used to estimate text heights 246 associated with one or more text line images 204, 206, 208, 404, 412 in order to create normalized text line images 410, 416 in preparation for optical character recognition. The method 500 may be implemented on a computer system, such as the system 200. For example, one or more steps of the method 500 may be implemented by the text line normalizer 212, the feature calculator 222, and/or the sequence recognizer 214. The method 500 may also be implemented by a set of instructions stored on a computer readable medium that, when executed by a processor, cause the computer system to perform the method. For example, all or part of the method 500 may be implemented by the CPU 238 and the memory 240. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 may begin with a document processing system 210 receiving a text line image 204, 206, 208, 404, 412 (block 502). The text line image 204, 206, 208, 404, 412 may be associated with a document 102 that is being analyzed by the document processing system 210. Properly analyzing the document 202 may require performing optical character recognition with an optical character recognizer 234 in order to recognize a text 236 in the document 202. To accurately perform optical character recognition, the optical character recognizer 234 may require that the text line image 204, 206, 208, 404, 412 be normalized with a text line normalizer 212, as discussed above. Thus, after the text line image 204, 206, 208, 404, 412 is received, the feature calculator 222 may calculate features associated with the text line image 204, 206, 208, 404, 412 (block 504). As discussed above, the feature calculator 222 may calculate a plurality of features associated with the text line image 204, 206, 208, 404, 412 (block 508). For example, the feature calculator 222 may calculate one or more horizontal projections of the text line image 204, 206, 208, 404, 412. The feature calculator 222 may also calculate a plurality of features associated with another text line image 204, 206, 208, 404, 412 (block 510). For example, the feature calculator 222 may determine that one or more other text line images 204, 206, 208, 404, 412 are near the received text line image 204, 206, 208, 404, 412. The feature calculator 222 may then access or otherwise estimate a text height 246 of the nearby text line image 204, 206, 208, 404, 412 to create a nearby text height 312 feature. Alternatively, after initially estimating the text height 246 of all of the text line images 204, 206, 208, 404, 412 on a particular page, the feature calculator 222 may calculate a majority text height, e.g., a text height of a majority of the text line images 204, 206, 208, 404, 412 on the page. In some embodiments, the text line normalizer 212 may create a feature vector 224, 226, 304 containing the calculated features. In certain implementations, one or more of blocks 502, 504, 508, and 510 may be performed at the same time. For example, the feature calculator 222 may calculate the features at the same time that the text line image 204, 206, 208, 404, 412 is received.

The sequence recognizer 214 may then analyze the text line image 204, 206, 208, 404, 412 and the features (block 506). For example, the sequence recognizer 214 may analyze a feature calculated from the text line image 204, 206, 208, 404, 412 (e.g., a pixel gradient 308) for evidence of a first height measure 218, 220. For example, the sequence recognizer 214 may look for areas of large change in the pixel gradient 308, which suggest an upper bound or lower bound of a height measure 218, 220. The sequence recognizer 214 may also analyze features calculated from other text line image 204, 206, 208, 404, 412. For example, the sequence recognizer 214 may use a nearby text height 312 as evidence of a first height measure 218, 220. The sequence recognizer 214 may use a machine learning model 216 to combine the evidence provided by the features into an estimated first height measure 218, 220 according to weights of the machine learning model 216. In some implementations, the machine learning model 216 may ignore one or more features and in further implementations the machine learning model 216 may weight each of the features differently.

The sequence recognizer 214 may then use the analysis to estimate a first height measure 218, 220 of the text line image 204, 206, 208, 404, 412 (block 514). As described above, the first height measure 218, 220 may include one or more of a lowercase text height measure 104, 406 and a capital text height 122, 408, depending on the normalization required by the optical character recognizer 234. The first height measure 218, 220 may include an upper bound 230, 242, and a lower bound 232, 244, as described above. Different height measures 218, 220 may be estimated depending on the text contained in the text line. For example, if the optical character recognizer 234 is configured for images normalized according to a lowercase text height measure 104, the sequence recognizer 214 may be configured to estimate a lowercase text height measure 104. The sequence recognizer 214 may use a machine learning model 216 to perform the analysis at blocks 506 and 514 and may train the machine learning model 216 to determine the weights for each of the features, as described in greater detail below. Additionally, the sequence recognizer 214 may have more than one machine learning model 216 and may use a different machine learning model 216 for text lines 204, 206, 208, 404, 412 with different types of text. For example, the sequence recognizer 214 may include a separate machine learning model 216 for text line images 204, 206, 208, 404, 412 with large proportions of capital letters and/or numbers, with a typical mix of lowercase and uppercase letters, only lowercase letters, only capital letters, and only numbers. Further, a machine learning model 142 may be configured to analyze a new type of text line image 204, 206, 208, 404, 412 by training a machine learning model 216 as described below. Additionally, all or some of the blocks 508, 510 may be optional.

In certain embodiments, the text line normalizer 212 may determine whether a second height measure 218, 220 is required (block 515). Depending on the optical character recognition requirements, different height measures (e.g., a lowercase text height measure 104, 406) may be necessary than what is estimated at block 514. For example, the sequence recognizer 214 may be configured to initially attempt to estimate a lowercase text height measure 104, 406 for all text line images 204, 206, 208, 404, 412. In certain instances, such as when the text line image 204, 206, 208, 404, 412 only contains capital letters, the initially-estimated lowercase text height measure 104, 406 may be inaccurate and, instead, a capital text height measure 122, 408 may be required. To determine whether a second height measure 218, 220 is required, the text line image 204, 206, 208, 404, 412, may be normalized according to the first text height measure 218, 220 and recognized by the optical character recognizer 234. The optical character recognizer 234 may output a confidence measurement, and if the confidence measurement is too low (e.g., below a minimum confidence threshold), the sequence recognizer 214 may determine that a second text height 218, 220 is required. The sequence recognizer 214 may then estimate and convert a second height measure 218, 220 of the text line image 204, 206, 208, 404, 412 based on the calculated features of the text line image 204, 206, 208, 404, 412 (block 516). For example, if the first text height measure is a lowercase text height measure 104, 406, and the optical character recognizer 234 outputs a low confidence measurement, that may indicate that the text line image 204, 206, 208, 404, 412 contains many capital letters, numbers, and/or letters with ascenders or descenders. This may indicate that a capital text height measure 122, 408 is required, so the sequence recognizer 214 may then estimate a capital text height measure 122, 408. However, the optical character recognizer 234 may require that text line images 204, 206, 208, 404, 412 be normalized by lowercase text height measure 104, 406, so the sequence recognizer 234 may then convert the capital text height measure 122, 408 into a lowercase text height measure 104, 406, as described above.

If no second height measure is necessary, or after estimating and converting the second height measure, processing may proceed directly to the sequence recognizer 214 estimating the text height 246 (block 517). The text height 246 may include one or more height measures 218, 220, for example the text height 246 may include both the first and the second text height measures in certain embodiments. The sequence recognizer 214 may estimate the text height 246 based on the height measures. For example, in some embodiments, the text height 246 may be estimated as one of the first and second height measures 218, 220 (e.g., the text height 246 may be estimated as the first height measure or the lowercase text height measure 104, 406). In other embodiments, the text height 246 may be estimated based on more than one height measure 218, 220. In one example, the text height 246 may be estimated by including more than one height measure 218, 220 in the text height 246 (e.g., the text height 246 includes both a lowercase text height measure 104, 406 and a capital text height measure 122, 408). In another example, one or more height measures 218, 220 may be consolidated into a composite height measure that is included in the text height 246.

The text line normalizer 212 may then normalize the text line image 204, 206, 208, 404, 412 based on the text height 246 (block 518). Depending on the estimated text height 246, the text line image 204, 206, 208, 404, 412 may need to be resized, cropped, or otherwise manipulated in order to conform to the text line normalization requirements of the optical character recognizer 234, as discussed above.

Although the method 500 is discussed in the context of a single text line image 204, 206, 208, 404, 412, the method 500 may be performed on multiple text line images 204, 206, 208, 404, 412. For example, the document 202 may contain multiple text line images 204, 206, 208, 404, 412 and the method 500 may be performed on each of the text line images 204, 206, 208, 404, 412 in order to prepare the document 202 for optical character recognition. The text line images 204, 206, 208, 404, 412 may be analyzed using the method 500 individually or in parallel depending on the implementation. In fact, in certain embodiments, the text line images 204, 206, 208, 404, 412 may include more than one line of text, e.g., multiple adjacent lines of text or all of the lines of text on a particular page of the document. The classifier may then be configured to analyze such text line images 204, 206, 208, 404, 412 using the method 500 to normalize multiple lines of text at the same time.

FIG. 6 depicts a flow diagram of an example method 600 according to an example embodiment of the present disclosure. The flow diagram includes a training system 602, a labeling system 608, a feature vector creator 610, and a sequence recognizer machine learning model 612. The training system 602 may be configured to orchestrate the operation of the method 600 and generate updated model parameters based on the outputs generated during the training, as detailed below. In some embodiments, the training system 602 may be implemented as part of a document processing system 210. The labeling system 608 may be a system that labels text line images 204, 206, 208, 404, 412 with an indication of the correct height measure 218, 220 for each text line image 204, 206, 208, 404, 412. The labeling system 608 may include one or both of a manual labeling system and an automatic labeling system. The feature vector creator 610 may be implemented by the feature calculator 222. The sequence recognizer machine learning model 612 may be implemented as the machine learning model 216 of the sequence recognizer 214.

The method 600 may be used to train one or more machine learning models 216, 612 associated with a sequence recognizer 214. For example, training the sequence recognizer machine learning model 612 may improve the accuracy of the sequence recognizer machine learning model 612 at estimating the text height 246 and/or height measure 218, 220 of text line images 204, 206, 208, 404, 412 containing particular types of text. Alternatively, training the sequence recognizer machine learning model 612 may enable the sequence recognizer machine learning model 612 to estimate the text height and/or height measure 218, 220 of text line images 204, 206, 208, 404, 412 containing new types of text. For example, the sequence recognizer machine learning model 612 may be initially trained to estimate a text height 246 and/or height measure 218, 220 of text line images 204, 206, 208, 404, 412 containing a particular type of text (e.g., a mix of lower case and capital letters) and, after completing the method 600, the sequence recognizer machine learning model 612 may be able to estimate a text height 246 and/or height measure 218, 220 of text line images 204, 206, 208, 404, 412 containing a new type of text (e.g., all capital letters). In another alternative, training the sequence recognizer machine learning model 612 may enable the sequence recognizer machine learning model 612 to estimate a new type of height measure 218, 220. For example, the sequence recognizer machine learning model 612 may initially only be trained to estimate a lowercase text height measure 104, 406 and, after completing the method 600, the sequence recognizer machine learning model 612 may be trained to estimate a capital text height measure 122, 408. Alternatively, separate sequence recognizer machine learning models 612 may be individually trained (e.g., one separate sequence recognizer machine learning model 612 to estimate lowercase text height measures 104, 406, and a second separate sequence recognizer machine learning model 612 to estimate capital text height measure 122, 408). Training such separate sequence recognizer machine learning models 612 may improve the accuracy of the respective estimates. In some embodiments, the method 600 may be performed more than once in order to train the sequence recognizer machine learning model 612. In other embodiments, the method 600 may only need to be performed once in order to properly train the classifier machine learning model 612. A machine learning operator, such as a document processing system developer, may determine the number of times the method 600 is performed. Alternatively, the training system 602 may determine the number of times the method 600 is performed. For example, the training system 602 may repeat the method 600 until the classifier machine learning model 612 is able to estimate height measures 218, 220 with a particular level of accuracy.

The method 600 may be implemented on a computer system, such as the system 200. For example, method 600 may be implemented in whole or in part by the text line normalizer 212. The method 600 may also be implemented by a set of instructions stored on a computer readable medium that, when executed by a processor, cause the computer system to perform the method. For example, all or part of the method 600 may be implemented by the CPU 238 and the memory 240. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

Additionally, FIG. 6 depicts multiple communications between the training system 602, the labeling system 608, the feature vector creator 610, and the sequence recognizer machine learning model 612. These communications may be transmissions between multiple pieces of hardware or may be exchanges between different programmatic modules of software. For example, the communications may be transmissions over a network between multiple computing systems, such as the Internet or a local networking connection. These transmissions may occur over a wired or wireless interface. Other communications may be exchanges between software modules, performed through an application programming interface (API), or other established communication protocols.

The method 600 may begin with the training system 602 creating a training text line image (block 614). The training system 602 may create the training text line image by extracting one or more text line images from a document 202, such as a training document. Alternatively, the training system 602 may be connected to or contain a memory that stores training text line images and may select one of the training text line images for use in training the sequence recognizer machine learning model 612. The training system 602 may create the training text line images based on the purpose for training the sequence recognizer machine learning model 612. For example, if the sequence recognizer machine learning model 512 is being trained to process text line images 204, 206, 208, 404, 412 with capital letters, the training system 602 may create the training text line image to include text with many capital letters or only capital letters. In another example, if the sequence recognizer machine learning model 612 is being trained to improve its accuracy, the training system 602 may create a training text line image that includes particularly difficult portions of text (e.g., text having many ascenders and/or descenders).

The labeling system 608 may then label the training text line image (block 520). In some implementations, the training text line images are manually or automatically labeled with indications of the correct text height. The training system 502 may then receive the labeled text line height (block 622). However, although depicted as occurring during the method 600, in some embodiments the training text line image may be labeled prior to performing the steps of the method 600. For example, the training text line image may be labeled beforehand and the labeled text line height may be stored on a memory contained within or connected to the training system 602. Thus, instead of receiving the labeled text line height from the label system 608 at block 622, the training system 602 may instead retrieve the labeled text line height from the memory.

The feature vector creator 610 may then calculate training features of the training text line image (block 624). As described above in connection with the feature vectors 224, 226, 304, the features may contain one or more pieces of information regarding the training text line image. The sequence recognizer machine learning model 612 may then receive and analyze the training features and training text line image (block 626). The sequence recognizer machine learning model 612 may analyze the training feature vector and text line image in the same manner as discussed above in connection with feature vectors 224, 226, 304 and text line images 204, 206, 208, 404, 412. In fact, the sequence recognizer machine learning model 612 may be trained better if the sequence recognizer machine learning model 612 analyzes the training feature vector and the training text line image in the same manner the machine learning model 216 analyzes feature vectors 224, 225, 304 and text line images 204, 206, 208, 404, 412 because doing so may produce a better training result and thus further improve the accuracy or configuration of the sequence recognizer machine learning model 612. Similarly, the sequence recognizer machine learning model 612 may then estimate a training text height associated with the training text line image using techniques similar to those discussed above in connection with the feature vectors 224, 225, 304 (block 628). Similar to the text height 246, the training text height may include one or more height measures 218, 220 (e.g., lowercase text height measures 104, 406 and/or capital text height measures 122, 408) of the training text line image.

The sequence recognizer machine learning model 612 may then generate a machine learning training output (block 630). The machine learning training output may include one or more of (i) the training text height, (ii) one or more height measures 218, 220 of the training text height, and (iii) a normalized training text line image that was normalized using the training text height. For example, the machine learning output may include an indication of the upper bound 230, 242 and lower bound 232, 244 of one height measure 218 of the training text line image. The machine learning output may also include a prediction strength measurement, indicating how confident the sequence recognizer machine learning model 612 was in its estimation of the training text height 246 and/or height measure 218, 220. In some embodiments, the classifier machine learning model 512 may be configured to format the machine learning training output to be similar to the formatting of the labeled text line height.

The training system 602 may then receive the machine learning training output (block 632) and compare the machine learning training output to the labeled text line height (block 634). The training system 602 may compare the training text height with the labeled text line height, e.g., by comparing one or more height measures 218, 220 of the training text height with one or more height measures 218, 220 of the labeled text line height to determine whether the sequence recognizer machine learning model 612 correctly estimates the training text height of the training text line image.

Based on the comparison at block 634, the training system 602 may then generate updated model parameters (block 636). The updated model parameters may be generated to improve the accuracy of the sequence recognizer machine learning model 612 by, for example, improving the accuracy of the classifier machine learning model 612 at estimating a text height of the training text line images. The updated model parameters may be generated by, for example, adjusting the weights assigned to particular features of the text line image 204, 206, 208, 404, 412. In other embodiments, generating updated model parameters may also include configuring the feature vector creator 610 to include additional features in the training feature vectors at block 624. For example, if the sequence recognizer machine learning model 612 is being trained to process text line images 204, 206, 208, 404, 412 from documents 202 with frequent text lines containing only capital letters, the feature vector creator 610 may be configured to include a nearby line height to provide more contextual information and thus more available contextual information. The training system 602 may be configured to automatically generate the updated model parameters, or may be configured to have the updated model parameters generated manually, such as by a training system operator or document analyst, or may be configured to generate the updated model parameters both automatically and manually. The sequence recognizer machine learning model 612 may then receive the updated model parameters and be updated to incorporate the updated model parameters (block 638). The method may then repeat again beginning at block 614 to further train the model as discussed above.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A computer-implemented method comprising:
   (a) receiving a first text line image associated with a first line of text contained within a document image;
   (b) calculating a first feature of the first text line image, wherein the first feature is chosen from the group consisting of (i) for each of a plurality of vertical positions in the first text line image, a sum of pixels at the respective vertical position across multiple horizontal positions within the first text line image, (ii) a gradient of the sums of pixels for the first text line image, and (iii) a gray value distribution at a plurality of vertical positions of the first text line image;
   (c) estimating a first text height of the first text line image with a sequence recognizer, wherein the sequence recognizer estimates the first text height using a machine learning model and the first feature; and
   (d) normalizing the first text line image based on the estimated first text height.

2. The method of claim 1, further comprising:
   calculating a second feature of a second text line image associated with a second line of text contained within the document image, wherein the sequence recognizer estimates the first text height using the first feature and the second feature.

3. The method of claim 2, wherein the second feature includes a second text height of the second text line image.

4. The method of claim 1, wherein the first feature includes the gradient of the sums of pixels across the plurality of vertical positions.

5. The method of claim 1, further comprising:
   calculating a third feature of a plurality of text line images associated with a plurality of lines of text contained within the document image, wherein the sequence recognizer estimates the first text height using the third feature.

6. The method of claim 5, wherein the third feature is a text height of a majority of the plurality of text line images.

7. The method of claim 1, wherein the sequence recognizer estimates the first text height with a machine learning model selected from the group consisting of a recurrent neural network, a convolutional neural network, a conditional random field model, a Markov model, and combinations thereof.

8. The method of claim 7, further comprising:
   receiving (i) a training text line image associated with a training line of text and (ii) a labeled text height indicating a desired text height corresponding to the training text line image;
   estimating a training text height of the training text line image;
   comparing the training text height with the labeled text height to create a training output comparison that identifies one or more errors in the training text height; and
   updating one or more parameters of the machine learning model based on the training output comparison.

9. The method of claim 1, further comprising:
   estimating one or both of an upper bound and a lower bound of the first text height, wherein estimating one or both of the upper bound and the lower bound further comprises predicting a probability that each of a plurality of vertical positions of the first text line image is the upper bound and/or the lower bound.

10. The method of claim 1, wherein the first text height includes one or more height measures chosen from the group consisting of a lowercase text height measure and a capital text height measure, and combinations thereof,
wherein the lowercase text height measure is a measure of a height of one or more lowercase letters in the text, and
wherein the capital text height measure is a measure of a height of one or more capital letters in the text.

11. The method of claim 10, further comprising:
estimating a first height measure of the first text line image;
determining that the first height measure incorrectly measures the first text height of the first text line image;
estimating a second height measure of the first text line image; and
calculating a third height measure based on the second height measure and a height measure conversion ratio.

12. The method of claim 11, wherein determining that the first height measure incorrectly measures the first text height of the first text line image further comprises:
performing optical character recognition on the first text line image after the first text line image is normalized based on the first height measure; and
measuring that a confidence measure of the optical character recognition is below a confidence threshold, and
wherein the first height measure is a lowercase text height measure, the second height measure is a capital text height measure, and the third text height measure is a lowercase text height measure.

13. The method of claim 1, further comprising repeating (a)-(d) on a plurality of text line images associated with the document image.

14. The method of claim 1, wherein the first feature includes the gray value distribution at the plurality of vertical positions.

15. The method of claim 1, wherein the first feature includes the sums of pixels at the respective vertical positions.

16. A system comprising:
a processor; and
a memory storing instructions which, when executed by the processor, cause the processor to:
(a) receive a first text line image associated with a first line of text contained within a document image;
(b) calculate a first feature of the first text line image, wherein the first feature is chosen from the group consisting of (i) for each of a plurality of vertical positions in the first text line image, a sum of pixels at the respective vertical position across multiple horizontal positions within the first text line image, (ii) a gradient of the sums of pixels for the first text line image across the plurality of vertical positions, and (iii) a gray value distribution at the plurality of vertical positions of the first text line image;
(c) estimate a first text height of the first text line image with a sequence recognizer,
wherein the sequence recognizer estimates the first text height using the first feature and a machine learning model; and
(d) normalize the first text line image based on the first text height.

17. The system of claim 16, wherein the memory contains further instruction which, when executed by the processor, cause the processor to:
calculate a second feature of a second text line image associated with a second line of text contained within the document image,
wherein the sequence recognizer estimates the first text height using the first feature and the second feature.

18. The system of claim 16, wherein the memory contains further instruction which, when executed by the processor, cause the processor to:
calculate a third feature of a plurality of text line images associated with a plurality of lines of text contained within the document image,
wherein the sequence recognizer estimates the first text height using the third feature.

19. The system of claim 16, wherein the memory contains further instruction which, when executed by the processor, cause the processor to:
receive (i) a training text line image associated with a training line of text and (ii) a labeled text height indicating a desired text height corresponding to the training text line image;
estimate a training text height of the training text line image with the sequence recognizer;
compare the training text height with the labeled text height to create a training output comparison that identifies one or more errors in the training text height; and
update one or more parameters of the machine learning model based on the training output comparison.

20. The system of claim 16, wherein the memory contains further instruction which, when executed by the processor, cause the processor to:
estimate a first height measure of the first text line image;
determine that the first height measure incorrectly measures the first text height of the first text line image;
estimate a second height measure of the first text line image; and
calculate a third height measure based on the second height measure and a height measure conversion ratio.

21. A tangible computer readable medium storing instructions which, when executed by one or more processors, cause the one or more processors to:
(a) receive a first text line image associated with a first line of text contained within a document image;
(b) calculate a first feature of the first text line image, wherein the first feature is chosen from the group consisting of (i) for each of a plurality of vertical positions in the first text line image, a sum of pixels at the respective vertical position across multiple horizontal positions within the first text line image, (ii) a gradient of the sums of pixels for the first text line image across the plurality of vertical positions, and (iii) a gray value distribution at the plurality of vertical positions of the first text line image;
(c) estimate a first text height of the first text line image with a sequence recognizer,
wherein the sequence recognizer estimates the first text height using the first feature and a machine learning model; and
(d) normalize the first text line image based on the first text height.

* * * * *